US012097407B2

(12) United States Patent
(10) Patent No.: US 12,097,407 B2
(45) Date of Patent: Sep. 24, 2024

Manser

(54) FRANGIBLE GOLF BALL

(71) Applicant: James Manser, Sea Girt, NJ (US)

(72) Inventor: James Manser, Sea Girt, NJ (US)

( * ) Notice: Subject to any disclaimer, the term of this patent is extended or adjusted under 35 U.S.C. 154(b) by 379 days.

(21) Appl. No.: 17/395,567

(22) Filed: Aug. 6, 2021

(65) Prior Publication Data

US 2023/0044038 A1 Feb. 9, 2023

(51) Int. Cl.

| | |
|---|---|
| ***A63B 37/00*** | (2006.01) |
| ***A61G 17/007*** | (2006.01) |
| ***A61G 17/08*** | (2006.01) |

(52) U.S. Cl.

CPC ........ *A63B 37/0051* (2013.01); *A61G 17/007* (2013.01); *A61G 17/08* (2013.01); *A63B 37/0029* (2013.01)

(58) Field of Classification Search

CPC .. A61G 17/08; A61G 17/007; A61G 17/0136; A63B 37/0051; A63B 37/0029; A63B 37/007; A63B 37/0075; A63H 37/00

USPC .................................................... 27/1; D99/5

See application file for complete search history.

(56) References Cited

U.S. PATENT DOCUMENTS

| | | | | | |
|---|---|---|---|---|---|
| 4,697,807 | A * | 10/1987 | Boundy | A63H 37/00 | 472/52 |
| 4,877,203 | A * | 10/1989 | Harden | B64D 1/16 | 222/400.7 |
| 5,005,784 | A * | 4/1991 | Harden | B64D 1/16 | 244/136 |
| 6,735,831 | B1 * | 5/2004 | Greiwe | A61G 17/0106 | 40/724 |
| 8,196,274 | B2 * | 6/2012 | Heckenbach | A61G 17/08 | 27/1 |
| 8,739,374 | B2 * | 6/2014 | Brown | F41F 1/06 | 27/1 |
| D730,014 | S * | 5/2015 | Bell | D99/5 | |
| 10,327,973 | B2 * | 6/2019 | Tibosch | A61G 17/08 | |
| 10,940,366 | B1 * | 3/2021 | Meadows | A63B 37/0003 | |
| D943,235 | S * | 2/2022 | LeBlanc | D99/5 | |
| 2002/0094885 | A1 * | 7/2002 | Finkel | A63B 43/00 | 473/354 |
| 2003/0066173 | A1 * | 4/2003 | Reece | A61G 17/08 | 27/1 |
| 2004/0209701 | A1 | 10/2004 | Finkel | | |
| 2005/0125973 | A1 * | 6/2005 | Hankel | A61G 17/007 | 27/1 |
| 2007/0281799 | A1 | 12/2007 | Wang et al. | | |
| 2010/0313395 | A1 * | 12/2010 | Heckenbach | A61G 17/08 | 27/1 |
| 2011/0220733 | A1 * | 9/2011 | Larson | A61G 17/08 | 239/722 |
| 2012/0052982 | A1 | 3/2012 | Costa | | |
| 2012/0227227 | A1 | 9/2012 | Heckenbach | | |
| 2014/0011610 | A1 * | 1/2014 | Caddell | A63B 37/0051 | 264/129 |

(Continued)

FOREIGN PATENT DOCUMENTS

| | | | |
|---|---|---|---|
| AU | 20030204405 | A1 | 12/2003 |
| DE | 202004012042 | U1 | 10/2004 |

*Primary Examiner* — William L Miller

(74) *Attorney, Agent, or Firm* — SLEMAN & LUND LLP

(57) ABSTRACT

A method of dispersing ashes of a subject comprising cremating the subject's body to form ashes, and introducing a sample of the ashes into a spherical golf ball having a frangible outer surface and at least one inner cavity.

17 Claims, 1 Drawing Sheet

(56) References Cited

U.S. PATENT DOCUMENTS

| | | | | |
|---|---|---|---|---|
| 2014/0041169 | A1* | 2/2014 | Brown | F41F 1/06<br>27/1 |
| 2018/0085272 | A1* | 3/2018 | Tibosch | A61G 17/08 |

* cited by examiner

FRANGIBLE GOLF BALL

FIELD OF THE INVENTION

The present disclosure relates generally to golf balls. More particularly, the present disclosure relates to frangible golf balls having an inner compartment for storing ashes.

BACKGROUND

Golf is enjoyed by a wide variety of players of different genders, dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well-known golf superstars, at least in part, have increased golf's popularity in recent years.

Because of this, many people have sentimental attachment to the game of golf, and to certain golf courses. In fact, certain iconic and historic golf courses draw players from ail over the world, and many players find themselves most at peace or. their favorite golf course.

SUMMARY OF THE DISCLOSURE

In some embodiments, a method of dispersing ashes of a subject comprising cremating the subject's body to form ashes, and introducing a sample of the ashes into a spherical golf ball having a frangible outer surface and at least one inner cavity.

BRIEF DESCRIPTION OF THE DRAWINGS

A more complete understanding of the present disclosure and certain advantages thereof may be acquired by referring to the following detailed description in consideration with the accompanying drawings, in which.

DETAILED DESCRIPTION

Despite the various constructions of golf balls, conventional devices are not suitable for dispersing ashes. There therefore is a need for further improvements to the devices and methods of manufacturing and using frangible golf balls. Among other advantages, the present disclosure may address one or more of these needs.

In the following description of various example structures, reference is made to the accompanying drawings, which form a part hereof, and in which are shown by way of illustration various example golf ball structures. It is to be understood that other specific arrangements of parts and structures may be utilized and structural, and functional modifications may be made without departing from the scope of the present invention. As some more specific examples, aspects of this invention may be practiced on balls having any desired construction, any number of pieces, any specific dimple design, and/or any desired dimple pattern.

Figure 1:
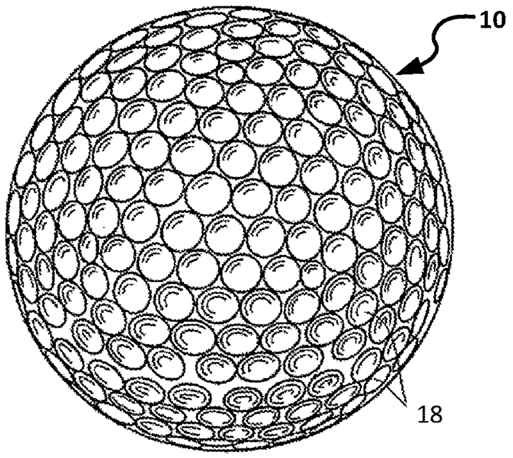
FIG. 1 schematically illustrates a golf ball having dimples.
Figure 2A:
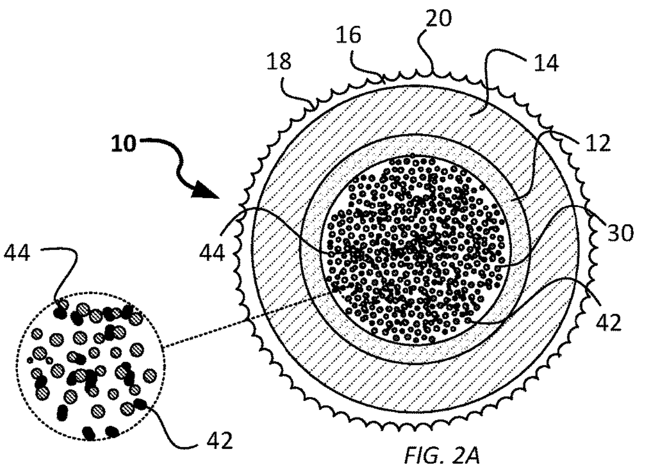
FIGS. 2A-B are schematic cross-sectional views of a golf ball according to certain embodiments, Various embodiments of the present invention will now be described with reference to the appended drawings. It is to be appreciated that these drawings depict only some embodiments of the invention and are therefore not to be considered limiting of its scope.
Figure 2B:
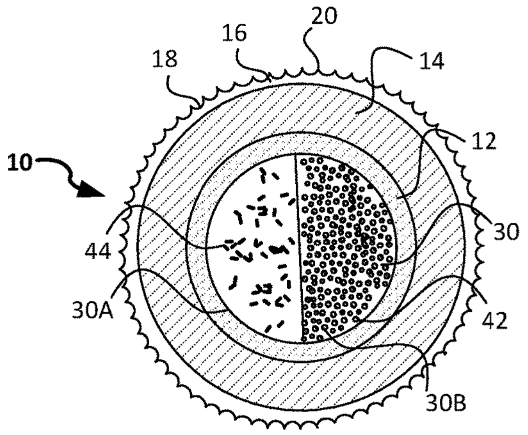

FIG. 1 shows an example of a golf ball 10 that includes a plurality of dimples 18 formed on its outer surface. Golf balls are generally spherical and the addition of dimples are often used to aid performance of the ball (e.g., to allow it to travel further or to interact or cut through the air in a specific manner). FIG. 2A-B illustrate some examples of golf ball 10 in accordance with this disclosure. As shown, golf ball 10 has a core 12, an intermediate layer 14, a cover 16 having a plurality of dimples 18 formed therein. In some examples, a topcoat 20 may be applied over the exterior surface of the cover 16 of the ball 10. It will be understood that any of these layers are optional and that golf balls may be formed of only one or some of these layers. For example, golf ball 10 alternatively may be only one piece such that the core 12 represents the entirety of the golf ball 10 structure (optionally with tan overlying coating layer 20), and the plurality of dimples 18 are formed on the core 12. The ball 10 also may have any other desired construction (e.g., two-piece solid construction, four-piece solid construction, a wound construction, etc.). The thickness of the topcoat 20 typically is significantly less than that of the cover 16 or the intermediate layer 14, and by way of example may range from about 5 to about 25 μm. The topcoat 20 preferably will have a minimal effect on the depth and volume of the dimples 18. Golf balls 10 according to this disclosure may include one or more pieces for the core 12 (e.g., also called an "inner core," an "outer core," etc.), one or more intermediate layers 14 (e.g., also called "mantle layers" or "barrier layers," etc.), and one or more cover layers 18 (e.g., also called an ".inner cover," an "outer cover," etc.).

The golf ball 10 and the various components thereof may be made from any desired materials without departing from this disclosure, including, for example, materials that are conventionally known and used in the golf ball art. As sortie more specific examples, the cover 16 of the golf ball 10 may be made of any number of materials such as ionomeric, thermoplastic, PLA, resins, elastomeric, urethane, TPU, balata (natural or synthetic), polybutadiene materials, or combinations thereof. In the example shown of FIG. 2A, instead of being solid throughout, golf ball 10 may include an inner cavity 30 formed in the innermost layer (e.g., formed within or instead of core 12). In fact, the number and construction of layers may be modified without departing from the scope of the disclosure. Thus, in a most basic embodiment, an outer cover 16 having, for example, dimples 18 may serve as a shell to define a cavity 30 with no other interstitial layers. In other examples, an intermediate layer 14 and/or core 12 are added to give the ball a familiar feel and/or heft.

Disposed within inner cavity 30 may be two substances, represented by small circles and dashes. First, inner cavity 30 may be formed to encase cremated ashes 42 or remains of a deceased person. Cremation of the mortal remains of living creatures, such as humans and pets, has become increasingly popular. The popularity of cremation is due to the fact that it is less expensive than being interred into the ground and it may avoid storage charges if the remains are located within the individual's residence if not stored at some exterior location, such as in a mortuary. The end product of the cremation process, after removal of non-combustible materials and grinding, is a small volume of finely ground ash. Traditionally, disposal of this ash has taken many forms. One form would be to dispose of the ash into a sea, ocean, lake, or on land in a particular location. Due to the strong connection that avid golfers have with the game of golf and/or specific golf courses, ashes 42 may be disposed within a golf ball 10, which is then used as a vehicle to disperse the ashes. In some examples, the core. intermediate layer and/or cover may all be frangible so that striking the golf ball shatters or breaks it and allows the remains to be scattered at the site of golf swing upon impact, (e.g., at a specific golf course). In this manner, friends and loved ones may honor a deceased person's wishes to have their ashes scattered as they wish. In addition to ashes 42, cavity 30 may optionally house a non-toxic material 44 (e.g., flour, talcum, baby powder, chalk, corn starch, etc.) to create a visible smoke cloud upon striking the ball. In some examples, the material may be dyed or colored as desired. In some examples, ashes 42 and non-toxic material 44 are housed within the same cavity 30 and mixed together. Alternatively, as shown in FIG. 2B, a golf ball 10 may define two or more cavities 30A,30B and the ashes 42 and non-toxic material 44 may be held in separate compartments.

In this example, all components outside of cavity 30 may tee frangible or breakable so that the contents of the cavity or cavities is released upon the ball being struck. In some examples, core 12, intermediate layer 14 and/or cover 16 may all be biodegradable so as not; to pollute or damage the site of use. Additionally, some or all components of the golf ball may be colored green so that the broken fragments of the ball do not pollute the visual aesthetic of the golf course while they disintegrate or degrade.

Golf balls in accordance with this disclosure may be produced in any desired manner without departing from this disclosure, including in generally conventional manners as are known and used in the art. Some example methods are described in more detail below.

In some examples, a player wishing that his or her remains (or those of a beloved pet) be spread via the frangible golf ball may relay their wishes to their loved ones. Upon their passing, the subject may be cremated and a small sample of their ashes may be mailed e.g., via USPS) or dropped off to a designated collection site to be disposed within a cavity of frangible golf ball. Ashes 42, and optionally, material 44 may be formed within one or more receptacles (e.g., the core, intermediate layer and/or cover), and the outside may be made to resemble a traditional golf ball. Additionally, text or drawings (e.g., the deceased's name, birth date, photograph or logo) may be added to the golf ball to commemorate the occasion.

In some examples, core 12, intermediate layer 14 and/or cover 16 may be formed by molding or lamination procedures, such as injection molding. The intermediate layers 14, when present, may be made from any desired material including materials that are conventionally known and used in the art, such as ionomer resins (e.g., SURLYN®'s, as described above), polyurethanes, TPUs, rubbers, and the like. Biodegradable plastics (e.g., starch blends, polylactic acid, cellulose-based plastics, etc.) can also be used. The intermediate layers 14 may have any desired physical properties (e.g., COR, density, thicknesses, hardnesses, etc.) and/or additives, including properties and additives that are conventionally known and used in the art.

The next step in this example golf ball production process involves forming a cover layer 16 around the golf ball interior (e.g., the core 12 and any present intermediate layers 14). The cover material 16 may be an ionomeric resin (e.g., a SURLYN® material), a thermoplastic polyurethane material, a thermosetting polyurethane material, a rubber material, biodegradable resins and/or the like.

As a next step, if desired, a finish material, such as paint and/or one or more other coating layer(s) 20, may be applied to the golf ball cover 16 surface. As another finishing step (which may take place before or after one of the coating steps as described above), printing may be applied to a golf ball. Any desired type of printing technique may be used without departing from this disclosure, including printing techniques such as pad printing and ink jet printing and/or other printing techniques that are conventionally known and used in the art. The finish materials (e.g., coating layer 20) may form a base material for carrying the micro surface roughness increasing material, as will be described in more detail below.

It will be understood that the golf ball body of the present disclosure has no limitation on its structure and includes a one-piece golf ball, a two-piece golf ball, a multi-piece golf ball comprising at least three layers, and a wound-core golf ball, including balls with different constructions, materials, and the like. Moreover, the present invention can be applied to any type of dimple pattern, including patterns with at least some non-round dimples (e.g., polygonal dimples, asymmetric dimples, dual radius dimples, etc.).

The present disclosure is described above and in the accompanying drawings with reference to a variety of example structures, features, elements, and combinations of structures, features, and elements. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims. For example, the various features and concepts described above in conjunction with the figures may be used individually and/or in any combination or subcombination without departing from this invention.

The invention claimed is:

1. A method of dispersing ashes of a subject comprising:
cremating the subject's body to form ashes; and
introducing a sample of the ashes into a spherical golf ball having a frangible outer surface and at least one inner cavity, wherein the spherical golf ball comprises at least one of a cover defining the frangible outer surface, an intermediate layer and a core; and
introducing a non-toxic material to the at least one inner cavity.

2. The method of claim 1, wherein the at least one inner cavity comprises a first cavity and a second cavity, and wherein introducing the sample of the ashes comprises introducing the sample of the ashes into the first cavity, and introducing a the non-toxic material comprises introducing the non-toxic material to the second cavity.

3. The method of claim 1, wherein the at least one inner cavity comprises a single cavity, and wherein introducing the sample of the ashes and the non-toxic material comprises introducing both the ashes and the non-toxic material to the single cavity.

4. The method of claim 1, wherein introducing the non-toxic material comprises introducing corn starch or flour to the at least one inner cavity.

5. The method of claim 1, further comprising the step of sending the ashes to a collection center for introducing the sample of the ashes into the spherical golf ball.

6. The method of claim 1, wherein the frangible outer surface is green.

7. A method of dispersing ashes of a subject comprising:
cremating the subject's body to form ashes;

introducing a sample of the ashes and a non-toxic material into a spherical golf ball having a frangible outer surface and at least one inner cavity; and striking the spherical golf ball with a club to shatter the frangible outer surface and allow the sample of ashes to disperse out of the spherical golf ball.

8. The method of claim 7, wherein the spherical golf ball comprises a cover defining the frangible outer surface, an intermediate layer and a core.

9. A frangible golf ball comprising:

a spherical golf ball having a frangible outer surface and at least one inner cavity;

a subject's ashes obtained from a cremation process, the subject's ashes being disposed within the at least one inner cavity; and a non-toxic material disposed within the at least one inner cavity;

wherein the spherical golf ball comprises at least one of a cover defining the frangible outer surface, an intermediate layer and a core.

10. The frangible golf ball of claim 9, wherein the at least one inner cavity comprises multiple inner cavities.

11. The frangible golf ball of claim 10, further comprising the non-toxic material disposed separately from the subject's ashes in the multiple inner cavities.

12. The frangible golf ball of claim 9, wherein the non-toxic material comprises flour or corn starch.

13. The frangible golf ball of claim 9, wherein the non-toxic material comprises chalk.

14. The frangible golf ball of claim 9, wherein the spherical golf ball comprises the cover defining the frangible outer surface, the intermediate layer and the core.

15. The frangible golf ball of claim 9, wherein at least one of the cover, the intermediate layer and the core is biodegradable.

16. The frangible golf ball of claim 9, wherein the at least one inner cavity comprises a single inner cavity.

17. The frangible golf ball of claim 16, further comprising the non-toxic material mixed in with the subject's ashes in the single inner cavity.

* * * * *